US006178022B1

United States Patent
Yoneyama (10) Patent No.: US 6,178,022 B1
(45) Date of Patent: Jan. 23, 2001

(54) OPTICAL TRANSMITTER AND OPTICAL RECEIVER FOR OPTICAL TIME DIVISION MULTIPLEXING TRANSMISSION

(75) Inventor: Ken-ichi Yoneyama, Tokyo (JP)

(73) Assignee: NEC Corporation, Tokyo (JP)

( * ) Notice: Under 35 U.S.C. 154(b), the term of this patent shall be extended for 0 days.

(21) Appl. No.: 08/987,352

(22) Filed: Dec. 9, 1997

(30) Foreign Application Priority Data

Dec. 10, 1996 (JP) .................................................. 8-329836

(51) Int. Cl.[7] .................................................. H04J 4/00
(52) U.S. Cl. .................... 359/123; 359/135; 359/137; 359/140
(58) Field of Search .................................. 359/123, 135, 359/137, 140

(56) References Cited

U.S. PATENT DOCUMENTS

| | | | | |
|---|---|---|---|---|
| 5,400,163 | * | 3/1995 | Mizuochi et al. ..................... | 359/124 |
| 5,515,196 | * | 5/1996 | Kitajima et al. ..................... | 359/180 |
| 5,717,510 | * | 2/1998 | Ishikawa et al. ..................... | 359/161 |
| 5,739,934 | * | 4/1998 | Nomura et al. ..................... | 359/124 |
| 5,870,213 | * | 2/1999 | Ishikawa et al. ..................... | 359/135 |

FOREIGN PATENT DOCUMENTS

| | | |
|---|---|---|
| 63-185133 | 7/1988 | (JP) . |
| 1-240090 | 9/1989 | (JP) . |
| 3-255736 | 11/1991 | (JP) . |
| 4-330834 | 11/1992 | (JP) . |
| 2530349 | 6/1996 | (JP) . |
| 8-307390 | 11/1996 | (JP) . |
| 8-321805 | 12/1996 | (JP) . |

\* cited by examiner

Primary Examiner—Leslie Pascal
Assistant Examiner—Hanh Phan
(74) Attorney, Agent, or Firm—Young & Thompson (57) ABSTRACT

An optical transmitter for optical time-division multiplexing transmission where optical signals are intensity-modulated by data signals and then time-division-multiplexed to output an optically-time-division-multiplexed signal, the optical transmission having devised for superposing a low-frequency signal with a frequency proper to each of channels to be multiplexed on each of the optical signals corresponding to the each of channels by conducting a small quantity of intensity modulation, and an optical receiver for receiving the optically-time-division-multiplexed signal from the optical transmitter, the optical receiver having devices for identifying each of the channel by detecting the low frequency when the optically-time-division-multiplexed signal received is demultiplexed to each of the channels.

20 Claims, 8 Drawing Sheets

OPTICAL TRANSMITTER AND OPTICAL RECEIVER FOR OPTICAL TIME DIVISION MULTIPLEXING TRANSMISSION

FIELD OF THE INVENTION

This invention relates to an optical transmitter and an optical receiver for optical time division multiplexing transmission where an optical signal is transmitted time-division-multiplexed.

BACKGROUND OF THE INVENTION

The high-speed transmission of signal has been reaching a limitation of operation speed of electrical circuit. Thus, it is difficult to further increase the velocity of transmitted signal. Currently, a next-generation ultra-high-speed and large-capacity communication means using an optical signal processing technique where an optical signal is processed as it is has been researched at some research institutions.

Also, as an effective one of the next-generation ultra-high-speed and large-capacity communication means, an optical time-division multiplexing system, where an optical pulse signal is generated by intensity-modulating short-pulse light with a very short pulse width and an optical time-division-multiplexed signal for ultra-high-speed and large-capacity communication is produced by multiplexing several optical pulse signals while giving a bit of time difference, has been researched.

However, in the conventional optical transmitter and optical receiver for optical time-division multiplexing transmission, means for identifying each channel in order to extract the optical pulse signal of each channel from the optical time-division-multiplexed signal transmitted to the optical receiver is not discussed. Namely, at present, only means for conducting the optical time-division multiplexing and demultiplexing are mainly researched and means for conducting the channel selection is not suggested.

This is because, at present, only the optical time-division multiplexing system with means for achieving main functions as the next-generation optical communication system has been researched and the research does not reach a stage to discuss the system after achieving the main functions.

SUMMARY OF THE INVENTION

Accordingly, it is an object of the invention to provide an optical transmitter for optical time-division multiplexing transmission where an optical signal of each channel in an optically-time-division-multiplexed signal to be transmitted can be identified to receive a predetermined channel.

It is another object of the invention to provide an optical receiver for optical time-division multiplexing transmission where an optical signal of each channel in an optically-time-division-multiplexed signal to be transmitted can be identified to receive a predetermined channel.

According to the invention, an optical transmitter for optical time-division multiplexing transmission where optical signals are intensity-modulated by data signals and then time-division-multiplexed to output an optical time-division-multiplexed signal, comprises:

means for superposing a low-frequency signal with a frequency proper to each of channels to be multiplexed on each of the optical signals corresponding to the each of channels by conducting a small quantity of intensity modulation.

According to another aspect of the invention, an optical transmitter for optical time-division multiplexing transmission, comprises:

data signal sources corresponding to a plurality of channels;

a plurality of means for outputting an optical signal corresponding to the data signal sources;

means for outputting a channel identification signal with a channel frequency proper to each of the plurality of channels to the optical signal corresponding to the plurality of optical signal outputting means;

a plurality of means for superposing the channel identification signal on the optical signal by using intensity modulation to output a channel-frequency-multiplexed optical signal; and means for optically-time-division-multiplexing the channel-frequency-multiplexed optical signal to output an optically-time-division-multiplexed signal.

According to another aspect of the invention, an optical transmitter for optical time-division multiplexing transmission, comprises:

data signal sources corresponding to a plurality of channels;

means for outputting a channel identification signal with a channel frequency proper to each of the plurality of channels;

means for adding a data signal output from a corresponding one of the data signal sources and the channel identification signal to output a channel-identification-signal-superposed signal;

a pulse light source to output pulse light with a constant repetition period;

an optical modulator for intensity-modulating the pulse light by the channel-identification-signal-superposed signal to output a channel-frequency-superposed optical signal; and means for optically-time-division-multiplexing the channel-frequency-superposed optical signal to output an optically-time-division-multiplexed signal.

According to another aspect of the invention, an optical receiver for optical time-division multiplexing transmission, the optical receiver receiving an optically-time-division-multiplexed signal from an optical transmitter for optical time-division multiplexing transmission where optical signals are intensity-modulated by data signals and the time-division-multiplexed to output an optically-time-division-multiplexed signal, the optical transmitter comprising means for superposing a low-frequency signal with a frequency proper to each of channels to be multiplexed on each of the optical signals corresponding to the each of channels by conducting a small quantity of intensity modulation, comprises:

means identifying each of the channel by detecting the low frequency when the optically-time-division-multiplexed signal received is demultiplexed to each of the channels.

According to another aspect of the invention, an optical receiver for optical time-division multiplexing transmission, the optical receiver receiving an optical time-division-multiplexed signal from an optical transmitter for optical time-division multiplexing transmission, the optical transmitter comprising data signal source corresponding to a plurality of channels, a plurality of means for outputting an optical signal corresponding to the data signal sources, means for outputting a channel identification signal with a channel frequency proper to each of the plurality of channels to the optical signal corresponding to the plurality of optical signal outputting means, a plurality of means for superposing the channel identification signal on the optical signal by using intensity modulation to output a channel-frequency-multiplexed optical signal, and means for optically-time-division-multiplexing the channel-frequency-multiplexed optical signal to output an optically-time-division-multiplexed signal, comprises:

means for identifying each of the channel by detecting the low frequency when the optical time-division-multiplexed signal received is demultiplexed to each of the channels.

According to another aspect of the invention, an optical receiver for optical time-division multiplexing transmission, the optical receiver receiving an optical time-division-multiplexed signal from an optical transmitter for optical time-division multiplexing transmission, the optical transmitter comprising data signal sources corresponding to a plurality of channels; means for outputting a channel identification signal with a channel frequency proper to each of the plurality of channels; means for adding a data signal output from a corresponding one of the data signal sources and the channel identification signal to output a channel-identification-signal-superposed signal; a pulse light source to output pulse light with a constant repetition period; an optical modulator for intensity-modulating the pulse light by the channel-identification-signal-superposed signal to output a channel-frequency-superposed optical signal; and means for optically-time-division-multiplexing the channel-frequency-superposed optical signal to output an optically-time-division multiplexed signal, comprises:

means for identifying each of the channel by detecting the low frequency when the optical time-division multiplexed signal received is demultiplexed to each of the channels.

According to another aspect of the invention, an optical receiver for optical time-division multiplexing transmission, the optical receiver receiving an optical time-division-multiplexed signal from an optical transmitter for optical time-division multiplexing transmission, the optical transmitter comprising data signal sources corresponding to a plurality of channels, a plurality of means for outputting an optical signal corresponding to the data signal sources, means for outputting a channel identification signal with a channel frequency proper to each of the plurality of channels to the optical signal corresponding to the plurality of optical signal outputting means, a plurality of means for superposing the channel identification signal on the optical signal by using intensity modulation to output a channel-frequency-multiplexed optical signal, and means for optically-time-division-multiplexing the channel-frequency-multiplexed optical signal to output an optically-time-division-multiplexed signal, comprises:

means for dividing the optically-time-division-multiplexed signal into signals corresponding to the number of the plurality of channels to output a divided optically-time-division-multiplexed signal;

a frequency-divided clock extracting circuit for generating a frequency-divided clock signal with a repetition frequency of the pulse light before the time-division multiplexing from the optically-time-division-multiplexed signal;

a phase shifting circuit for shifting a phase of the frequency-divided clock signal; and an optical time-division demultiplexing means for taking out the divided optically-time-division-multiplexed signal for each of the plurality of channels while synchronizing with a timing of the frequency-divided clock signal to output an demultiplexed optically-time-division-multiplexed signal.

According to another aspect of the invention, an optical receiver for optical time-division multiplexing transmission, the optical receiver receiving an optical time-division-multiplexed signal from an optical transmitter for optical time-division multiplexing transmission, the optical transmitter comprising data signal sources corresponding to a plurality of channels; means for outputting a channel identification signal with a channel frequency proper to each of the plurality of channels; means for adding a data signal output from a corresponding one of the data signal sources and the channel identification signal to output a channel-identification-signal-superposed signal; a pulse light source to output pulse light with a constant repetition period; an optical modulator for intensity-modulating the pulse light by the channel-identification-signal-superposed signal to output a channel-frequency-superposed optical signal; and means for optically-time-division-multiplexing the channel-frequency-superposed optical signal to output an optically-time-division-multiplexed signal, comprises:

means for dividing the optically-time-division-multiplexed signal into signals corresponding to the number of the plurality of channels to output a divided optically-time-division-multiplexed signal;

a frequency-divided clock extracting circuit for generating a frequency-divided clock signal with a repetition frequency of the pulse light before the time-division multiplexing from the optically-time-division-multiplexed signal;

a phase shifting circuit for shifting a phase of the frequency-divided clock signal; and an optical time-division demultiplexing means for taking out the divided optically-time-division-multiplexed signal for each of the plurality of channels while synchronizing with a timing of the frequency-divided clock signal to output an demultiplexed optically-time-division-multiplexed signal.

BRIEF DESCRIPTION OF THE DRAWINGS

The invention will be explained in more detail in conjunction with the appended drawings, wherein.

DESCRIPTION OF THE PREFERRED EMBODIMENTS

Before explaining an optical transmitter and an optical receiver for time-division multiplexing transmission in the preferred embodiments, the aforementioned conventional optical transmitter and receiver circuits will be explained in FIGS. 1 and 2.

Figure 1:
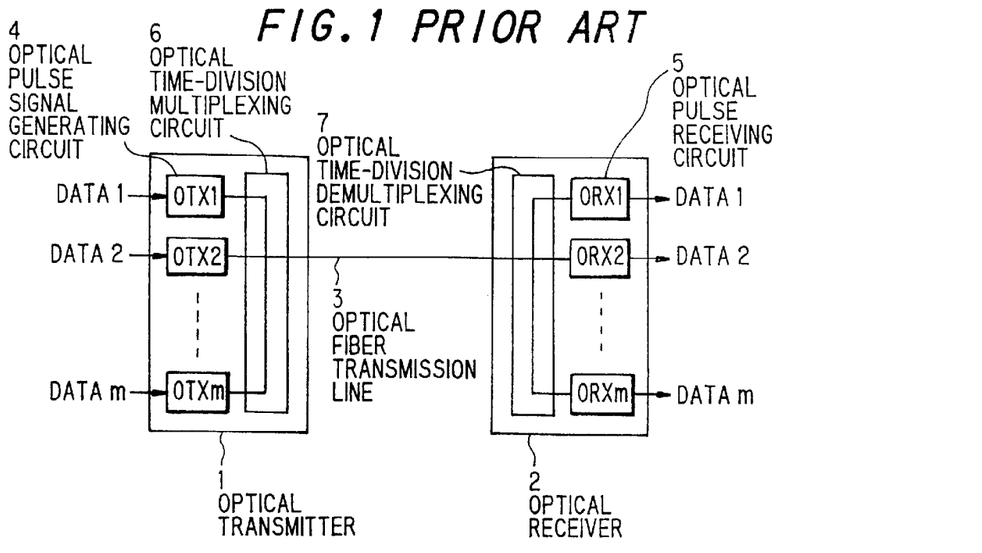
FIG. 1 is a block diagram showing a conventional optical transmitter and receiver for optical time-division multiplexing transmission.

FIG. 1 shows transmitter and receiver circuits of a conventional optical time-division multiplexing system. In optical transmitter 1, m channels of electrical data signals (DATA 1 to m) are converted into intensity-modulated optical pulse signals by optical pulse signal generating circuits 4. In an optical time-division multiplexing circuit 6, the m optical pulse signals generated by the optical pulse signal generating circuits 4 are multiplexed adding time difference to give an optical time-division-multiplexed signal with a transmission capacity of m times.

Then, the optical time-division-multiplexed signal is transmitted through an optical fiber transmission line 3 to an optical receiver 2, demultiplexed into m channels of optical pulse signals by an optical time-division demultiplexing circuit 7, then restored to the original electrical data signals by an optical pulse signal receiving circuits 5.

Figure 2:
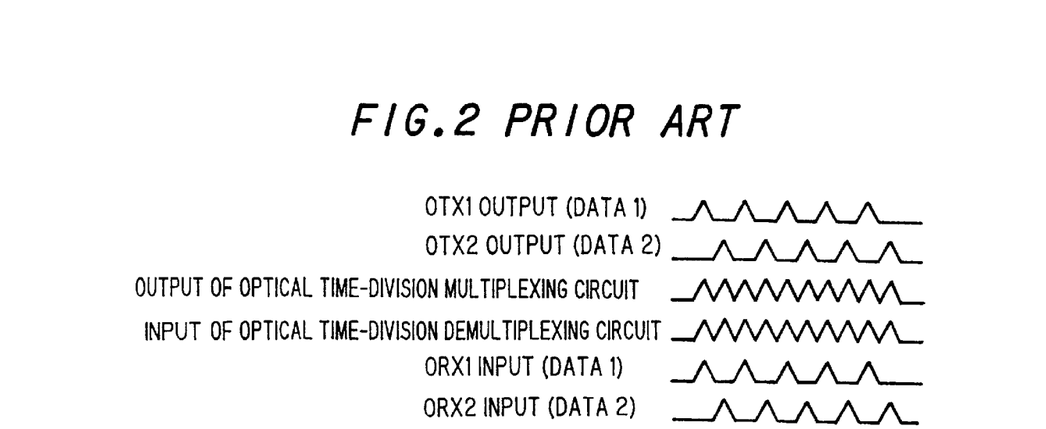
FIG. 2 is an illustration showing an example of an optical signal in the conventional optical transmitter and receiver in FIG. 1.

FIG. 2 shows an example of optical signal waves in the conventional optical time-division multiplexing system. In this example, the number of multiplexed channels, m=2 is used. The optical pulse signals in the respective channels to be output from the optical pulse signal generating circuit 4 of the optical transmitter 1 have a pulse width sufficiently shorter than the repetition period. Multiplexing the optical pulse signals with adding time differences between two channels in the optical time-division multiplexing circuit 6, the optical time-division-multiplexed signal with a transmission speed of two times is output from the optical time-division multiplexing circuit 6. The optical time-division-multiplexed signal transmitted to the optical receiver 2 is input to the optical time-division demultiplexing circuit 7, where it is demultiplexed into optical pulse signals for the respective channels.

Next, an optical transmitter and an optical receiver for time-division multiplexing transmission in the first preferred embodiment will be explained in FIG. 3, wherein like parts are indicated by like reference numerals as used in FIG. 1.

An optical transmitter 1 is provided with low-frequency oscillators 9, where a natural frequency is assigned to each channel. Thus, by passing an optical pulse signal through an optical modulator 8 to modulate with the low frequency, the low frequency is superposed on the optical signal to give a small quantity of intensity modulation.

An optical receiver 2 divides part of an optical pulse signal supplied to an optical pulse signal receiving circuit 5 and then input it to a low-frequency monitoring circuit 11. The low-frequency monitoring circuit 11 detects the low frequency superposed on the optical pulse signal of the received channel, judging whether the low frequency has a designated frequency, then outputting the judgement to a timing control circuit 10. The timing control circuit 10 controls the demultiplexing timing of an optical time-division demultiplexing circuit 7 until the designated low frequency is detected by the low-frequency monitoring circuit 11. Thus, an optical signal of a predetermined channel can be supplied to the optical pulse signal receiving circuit 5 corresponding to the predetermined channel.

Figure 4:
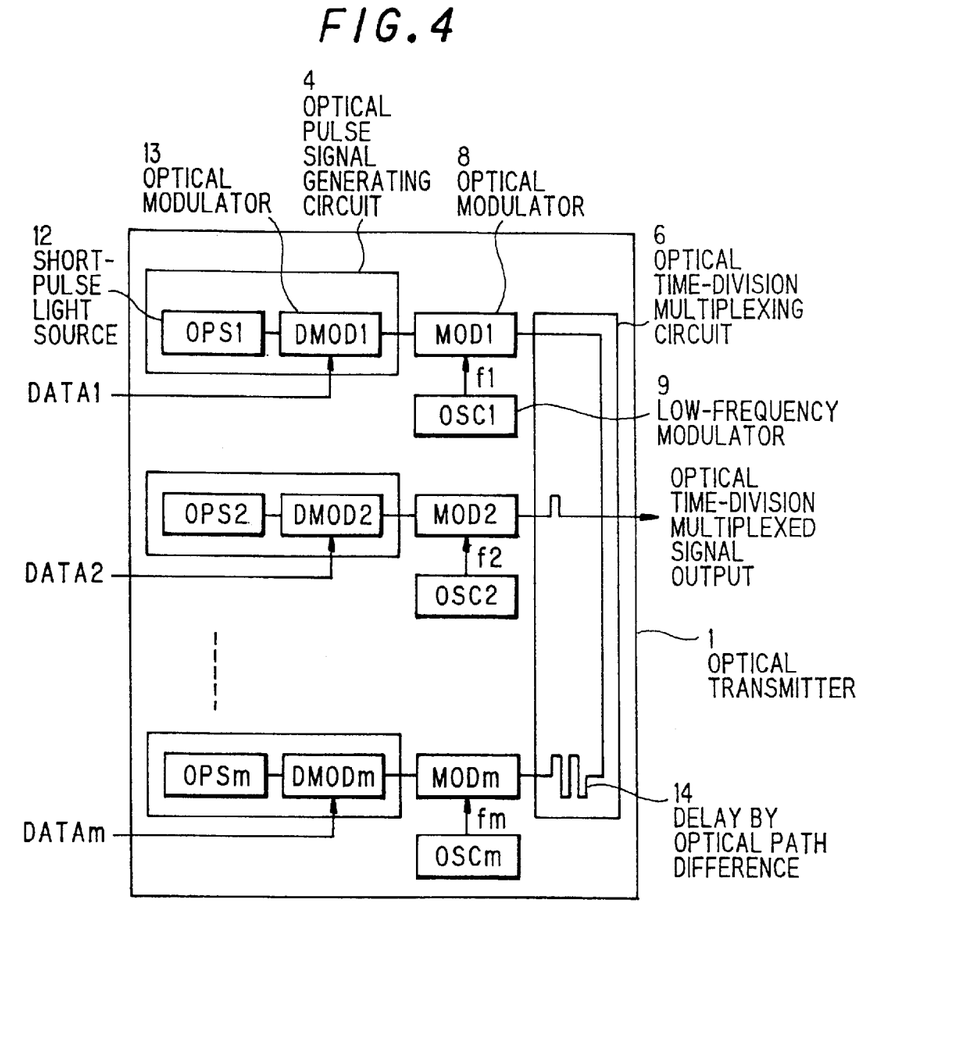
FIG. 4 is a block diagram showing an optical transmitter in a first preferred embodiment according to the invention.

FIG. 4 is a detailed illustration showing the optical transmitter in the first embodiment. An optical pulse signal generating circuit 4 is composed of a short-pulse light source 12 and an optical modulator 13. Short-pulse light with a constant repetition period to be generated by the short-pulse light source 12 is supplied to the optical modulators 13 (DMOD1–m), and the passing of the short-pulse light is turned on or off depending on a data signal to be supplied to the optical modulator 13. Thus, an optical pulse signal intensity-modulated by the data signal is generated. In case of the conventional optical transmitter in FIG. 1, the optical pulse signals of the respective channels to be produced as described above are supplied to the optical time-division multiplexing circuit 6, multiplexed therein, and thereby an optical time-division multiplexed signal is produced.

However, in the optical transmitter of the invention in FIG. 4, the optical pulse signals to be output from the optical pulse signal generating circuits 4 are supplied to second optical modulators 8 (MOD1–m). Then, adding a low frequency to be output from the low-frequency oscillator 9 with a frequency proper to each channel to the second optical modulator 8, a small quantity of intensity modulation by the low frequency is given to the optical pulse signal passing through the optical modulator 8. The low frequency is used as a channel identification signal. Then, the optical pulse signals, on each of which the low frequency for the channel identification is superposed by a small quantity of intensity modulation, are input to the optical time-division multiplexing circuit 6, multiplexed adding a time difference to each channel, then output as an optical time-division-multiplexed signal to the optical fiber transmission line.

Figure 5:
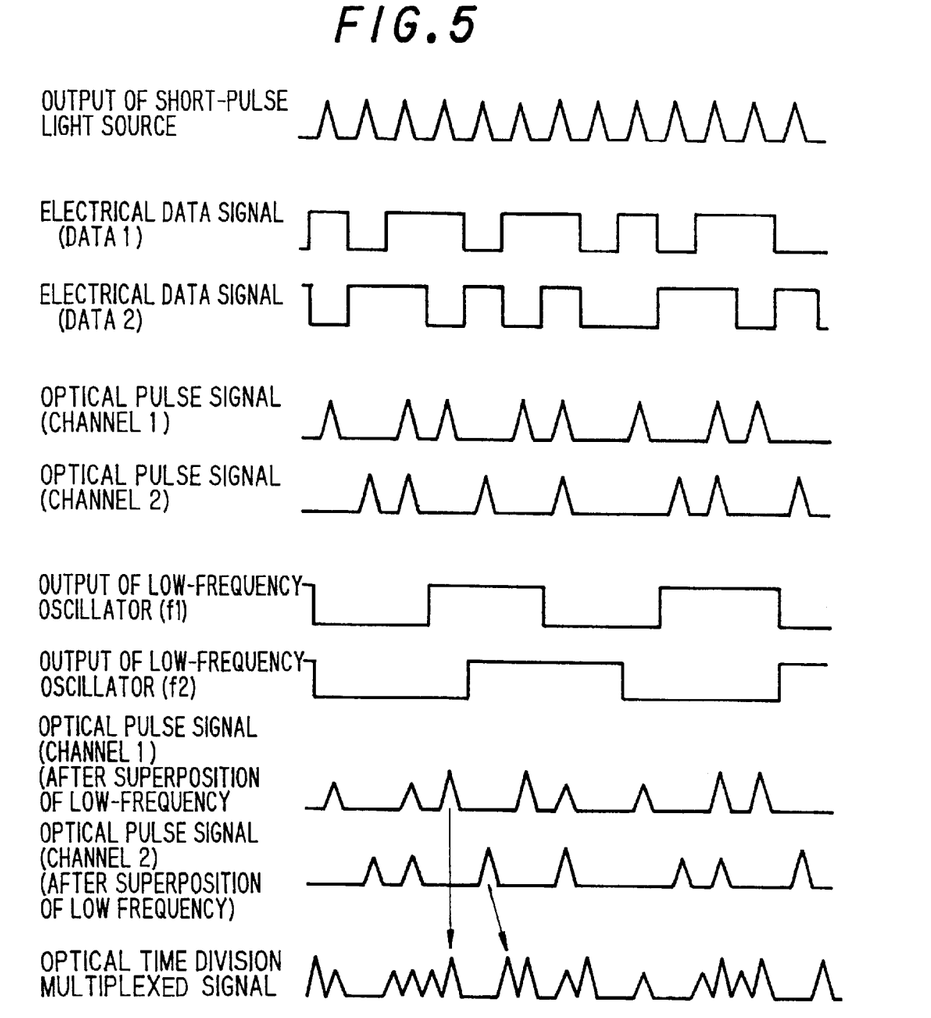
FIG. 5 is an illustration showing an example of waveforms at respective components of the optical transmitter in FIG. 4.

FIG. 5 shows an example of waveforms at the respective components in the optical transmitter of this embodiment. In this example, two channels are multiplexed. The short-pulse light output from the short-pulse light source 12 is intensity-modulated (ON/OFF) by an electrical data signal of each channel in the first optical modulator, thereby giving an optical pulse signal. The optical pulse signal is a bit intensity-modulated by a low frequency assigned to each channel at the optical modulator 8 for the low-frequency modulation. Then, the optical time-division multiplexing circuit 6 multiplexes the optical pulse signals of the respective channels with the low frequency superposed by modulating a bit. In case of the multiplexing, the optical pulse signal of the channel 2 is delayed by an optical path difference in the optical time-division multiplexing 6 not to overlap the optical signal of the channel 1.

Examples of devices available for the respective functional blocks that compose the optical transmitter are as follows. For the short-pulse light source 12, a mode-locked laser is typically used. For example, a semiconductor mode-locked laser diode where a supersaturated absorption band is formed in the semiconductor laser (H. Yokoyama et al., IEICE Technical Report, LQE94-57, pp.17–22, November, 1994), and a ring laser where an optical fiber amplifier such as an erbium-doped fiber amplifier is formed to be ring-shaped (S. Kawanishi, OPTELECTRONICS-Devices and Technologies, Vol. No. 4, pp.447–460, December, 1995), which has been researched and developed, are available. For the intensity modulator for the intensity modulation of the data signal and the low frequency, an electro-absorption modulator that is generally used in optical communications and a $LiNbO_3$ modulator using $LiNbO_3$ crystal are available. For the optical time-division multiplexing circuit 6, an optical waveguide coupler that is formed on an optical waveguide and an optical fiber coupler composed of an optical fiber are available. Meanwhile, in these optical couplers, the time-division multiplexing can be conducted by giving a difference in optical path length before coupling optical pulse signals of the respective channels.

Figure 6:
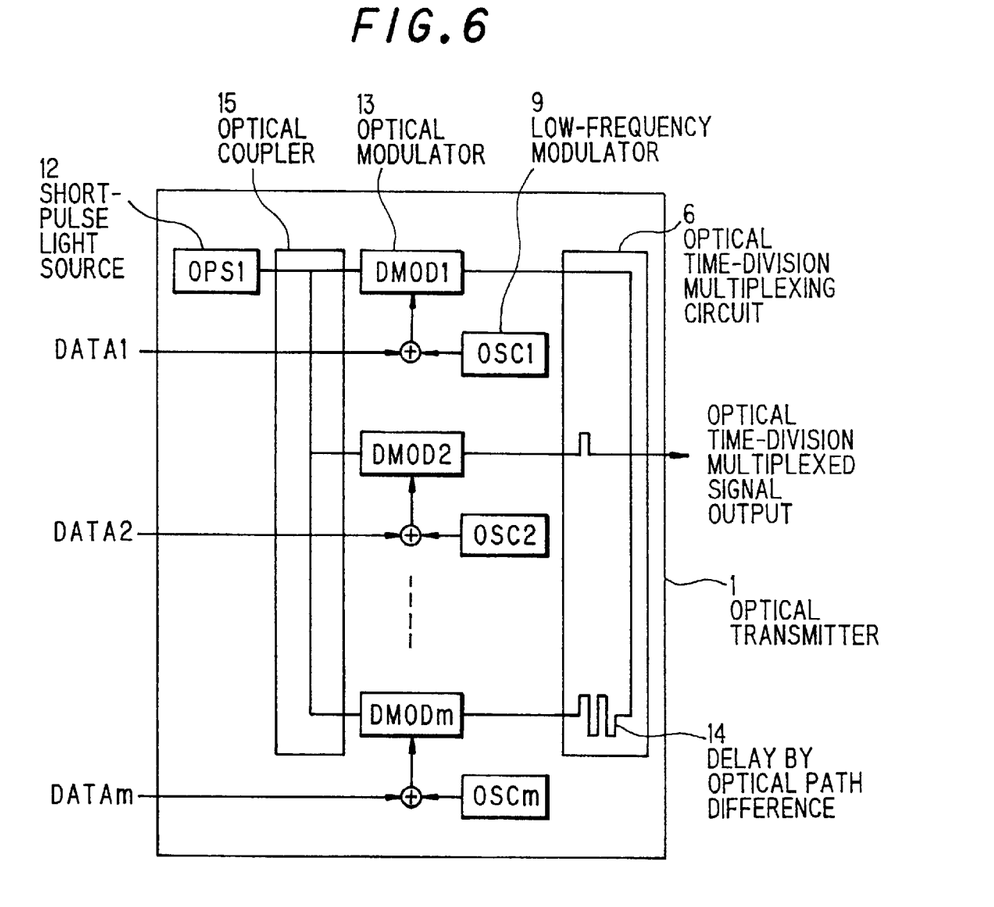
FIG. 6 is a block diagram showing an optical transmitter in a second preferred embodiment according to the invention.

An optical transmitter in the second preferred embodiment will explained in FIG. 6, wherein like parts are indicated by like reference numerals as used in FIG. 4. In this embodiment, the number of the short-pulse light source 12 is one to the optical transmitter 1, and the short-pulse light is divided by an optical coupler 15, distributed to the respective channels. Also, a pair of the optical modulators used for the intensity modulation of the data signal and low frequency in the first embodiment are unified, and the data signal and the low frequency are previously coupled, then input to the optical modulator 13. Thereby, the optical transmitter in the second embodiment can be significantly simplified in comparison with that in the first embodiment.

Figure 3:
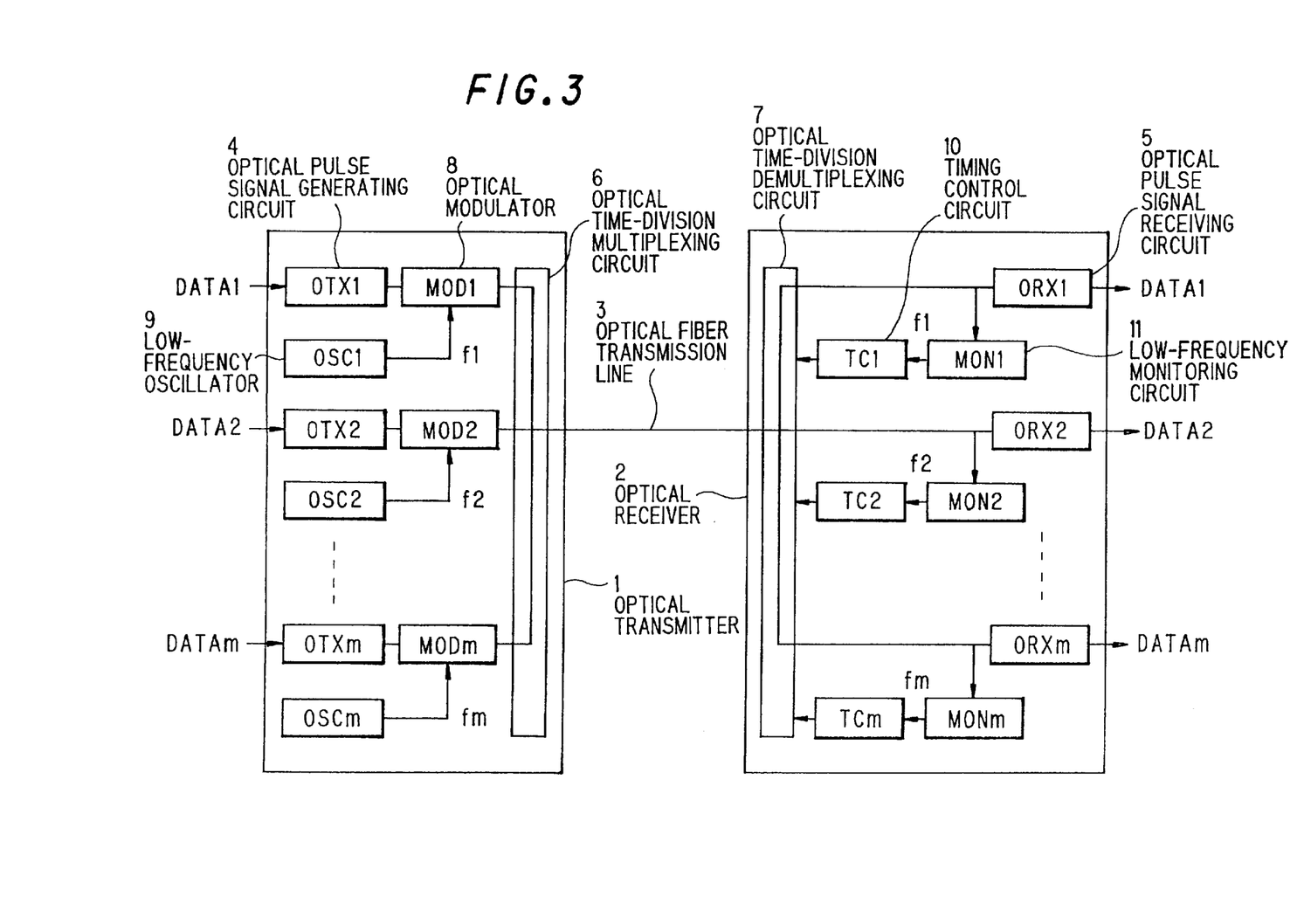
FIG. 3 is a block diagram showing an optical transmitter and an optical receiver for optical time-division multiplexing transmission in a preferred embodiment according to the invention.
Figure 7:
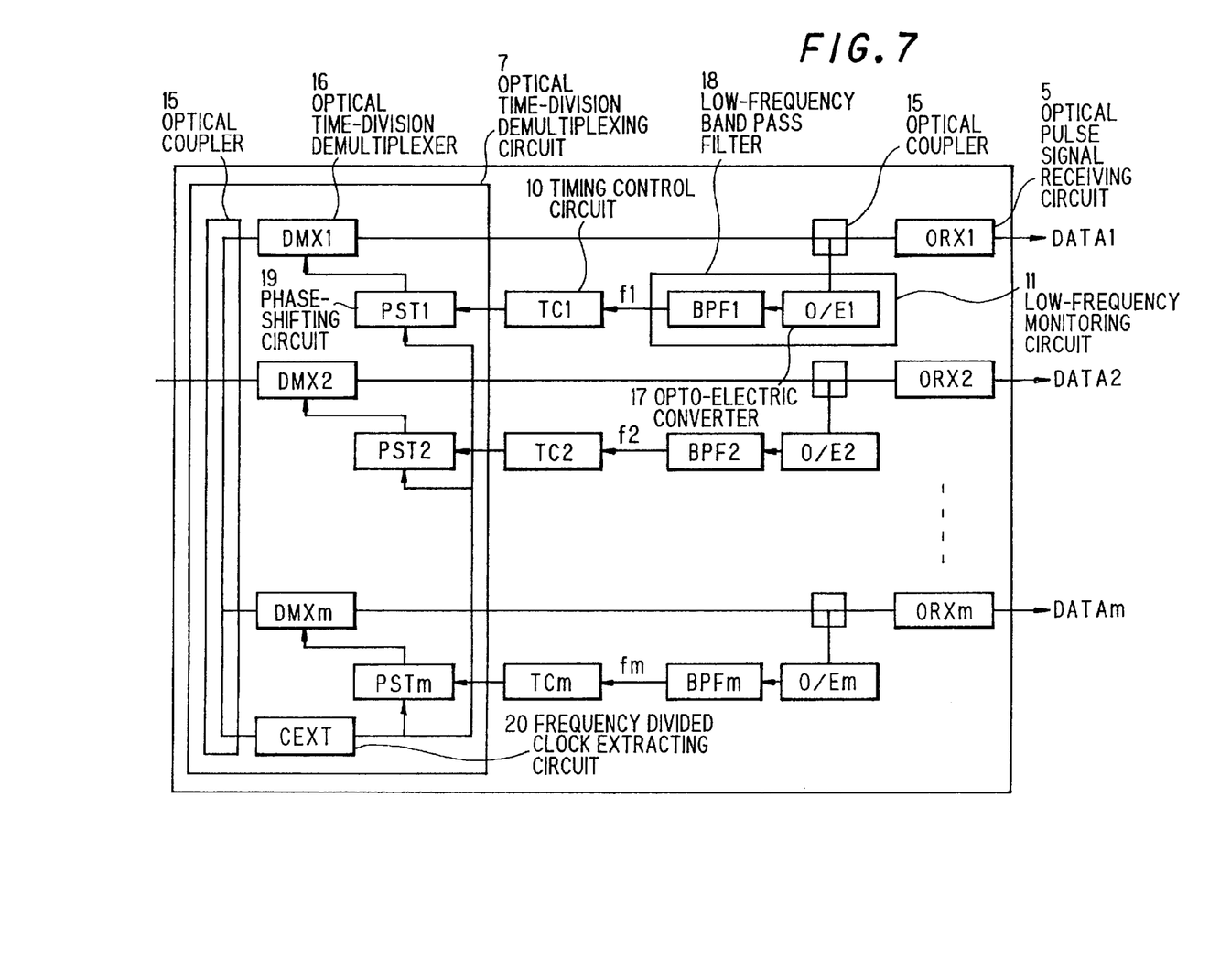
FIG. 7 is a block diagram showing an optical receiver in a preferred embodiment according to the invention.

The optical receiver 2 in the preferred embodiment will be detailed in FIG. 7, wherein like parts are indicated by like reference numerals as used in FIG. 3. The optical time-division-multiplexed signal supplied to the optical receiver 2 is divided into the optical pulse signals of the respective channels by the optical time-division demultiplexing circuit 7. The optical time-division demultiplexing circuit 7 is composed of an optical coupler 15, optical time-division demultiplexers 16, a frequency-divided clock extracting circuit 20, and phase-shifting circuits 19. First, the optical time-division-multiplexed signal input to the optical coupler 15 is opto-electrically distributed to the optical time-division demultiplexers 16 corresponding to the number (m) of the channels and to the frequency-divided clock extracting circuit 20. The frequency-divided clock extracting circuit 20 generates an electrical frequency-divided clock signal with a repetition frequency (a frequency of 1/m of the repetition frequency of the optical time-division-multiplexed signal) of the optical pulse signal before multiplexing from the optical time-division-multiplexed signal, and outputs it.

The frequency-divided clock signal generated is divided into m signals, which are supplied through the respective phase-shifting circuits 19 to the respective optical time-division demultiplexers 16. The optical time-division demultiplexers 16 have a function that takes out an optical time-division-multiplexed signal supplied while synchronizing with the timing of the frequency-divided clock signal and outputs it. Here, the channel to be taken out can be changed by adjusting the phase of the frequency-divided clock signal in the phase-shifting circuit 19 which is inserted in the line through which the frequency-divided clock signal is supplied to the optical time-division demultiplexer 16.

Then, the optical pulse signals of the respective channels, which are thus taken out by the optical time-division demultiplexing circuit 7, are output to the optical pulse signal receiving circuits 5 of the respective channels and simultaneously divided by optical couplers 15 located between them to also output to the low-frequency monitoring circuits 11.

The low-frequency monitoring circuit 11 is composed of an opto-electric converter 17 and a low-frequency band pass filter 18. The low-frequency band pass filters 18 with different extraction frequencies are disposed corresponding to the respective channels so as to extract only the frequency component assigned to each channel. In operation, the optical pulse signal is converted into an electrical signal by the opto-electric converter 17, and then the low frequency superposed on the optical pulse signal by the small quantity of intensity modulation is extracted by the low-frequency band pass filter 18. In this case, when the optical pulse signal supplied belongs to another channel, the low frequency superposed on the optical pulse signal does not coincide with the extraction frequency of the low-frequency band pass filter 18. Therefore, the low-frequency band pass filter 18 outputs no signal. On the contrary, when the optical pulse signal supplied belongs to the designated channel, the low frequency superposed on the optical pulse signal coincides with the extraction frequency of the low-frequency band pass filter 18. Therefore, the low-frequency band pass filter 18 outputs the low frequency.

Then, the timing control circuit 10 detects the level of the low frequency output from the low-frequency band pass filter 18. When no low frequency is output, the timing control circuit 10 controls the phase-shifting circuit 19 to change the phase of the frequency-divided clock signal passed through to look for the state that the low frequency is output.

Meanwhile, in this embodiment, the low-frequency band pass filter 18 extracts the low frequency after converting the optical pulse signal demultiplexed into the electrical signal. Alternatively, by disposing the low-frequency band pass filter before the opto-electric converter 17 (not shown), the low frequency in the optical state may be extracted and then converted into the electrical signal.

Figure 8:
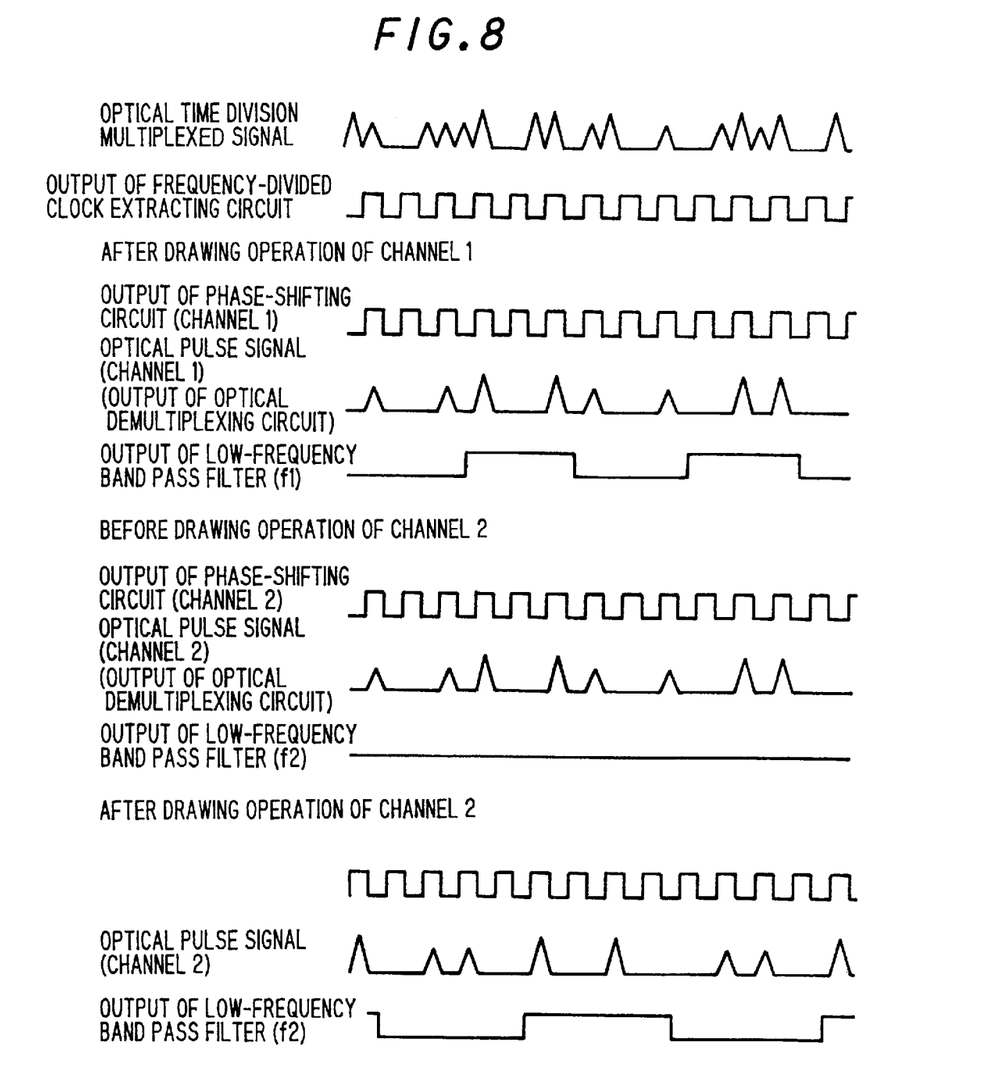
FIG. 8 is an illustration showing an example of waveforms at respective components of the optical receiver in FIG. 7.

FIG. 8 shows an example of waveforms at the respective components in the optical receiver 2. In this example, an optical signal with two channels multiplexed is demultiplexed. For channel 1, waveforms after the selection of channel is regularly conducted are shown. For channel 2, waveforms in the cases that the drawing operation in channel selection is not suitably conducted and thereafter it is regularly completed are shown. In case of channel 1, the timing of the frequency-divided clock signal output from the phase-shifting circuit 19 is synchronized with the channel 1 signal of the optical time-division-multiplexed signal. Therefore, the optical pulse signal of channel 1 is regularly taken out as the output of the optical time-division demultiplexing circuit 7, and the low frequency (with a frequency of f1) of channel 1 which is superposed on the optical pulse signal is output from the low-frequency band pass filter 18.

In case of channel 2, before completing the drawing operation, the timing of the frequency-divided clock signal output from the phase-shifting circuit 19 is synchronized with the channel 1 signal of the optical time-division-multiplexed signal. In this case, the optical pulse signal of channel 1 is output from the optical time-division demultiplexer 16 for channel 2. At this time, the low-frequency band pass filter 18 (for frequency f2) for channel 2 outputs no signal since the low frequency with a frequency of f1 is superposed on the optical pulse signal. Therefore, the timing control circuit 10 for channel 2 is actuated, charging the delay time of the phase-shifting circuit 19 until the low frequency (f2) for channel 2 is detected. After completing the drawing operation of channel 2, the low frequency (f2) for channel 2 is output from the low-frequency band pass filter 18 and the timing control circuit 10 holds the current operation.

Examples of devices available for the respective functional blocks that compose the optical receiver 2 are as follows. For the frequency-divided clock extracting circuit 20, an optical phase-locked loop (optical PLL) reported in S. Kawanishi, OPTELECTRONICS-Devices and Technologies, Vol. 10, No. 4, pp. 447–460, December, 1995, and a semiconductor mode-locked laser diodereported in R. Ludwig et al., Electronics Letters, Vol. 32, pp. 327–329, Feb. 15, 1996 are available. For the optical time-division demultiplexer 16, an electro-absorption modulator (EA modulator) reported in Y. Takahashi et al., OPTELECTRONICS-Devices and Technologies, Vol. 10, No. 4, pp. 543–560, December, 1995, and a Mach-Zehnder interferometer reported in R. Ludwig et al., Electronics Letters, Vol. 32, pp. 327–329, Feb. 15, 1996 are available.

Figure 9:
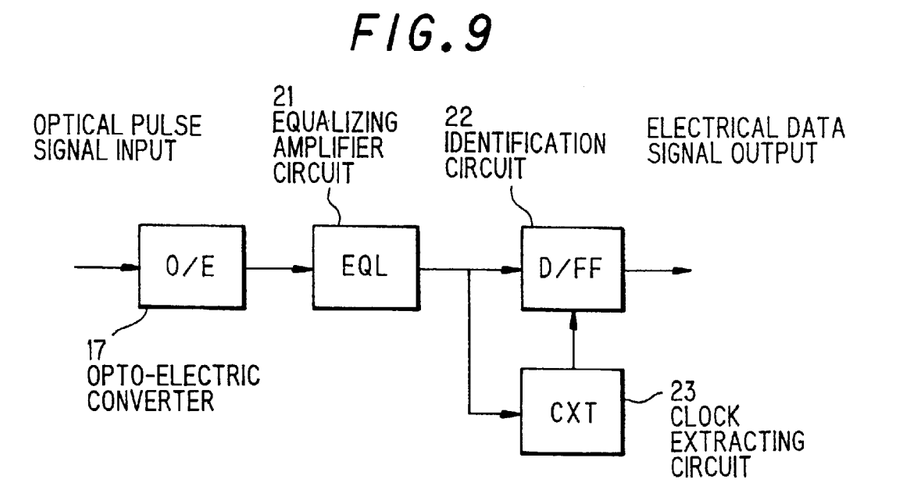
FIG. 9 is a block diagram showing a typical optical pulse signal receiving circuit.

The optical pulse signal receiving circuit 5 is of a type generally used in optical communications, as shown in FIG. 9. In operation, an opto-electric converter 17 converts the optical pulse signal into an electrical signal, and then an equalizing amplifier circuit 21 adjusts the waveform, and an identification circuit 22 identifies the signal while synchronizing with a clock to be taken out by an clock extracting circuit 23 to reproduce the data signal.

Although the invention has been described with respect to specific embodiment for complete and clear disclosure, the appended claims are not to be thus limited but are to be construed as embodying all modifications and alternative constructions that may be occurred to one skilled in the art which fairly fall within the basic teaching here is set forth.

What is claimed is:

1. An optical transmitter for optical time-division multiplexing transmission where optical signals are intensity-modulated by data signals and then time-division-multiplexed to output an optical time-division-multiplexed signal, comprising:

plural data signal sources of plural channels operatively connected to corresponding ones of plural optical signal outputting means for outputting optical signals;

means for outputting a channel identification signal comprising a low-frequency signal with a natural frequency proper to each of the optical signals;

means for superposing the channel identification signal comprising the low-frequency signal with the natural frequency proper to each of the plural channels to be multiplexed on each of said optical signals corresponding to said each of plural channels by conducting a small quantity of intensity modulation to output a channel frequently multiplexed optical signal; and means for optical time division multiplexing said frequency multiplexed optical signal to output an optically time division multiplexed signal.

2. An optical transmitter, according to claim 1, wherein:

said low-frequency signal has a frequency lower than a repetition frequency of said optical signals.

3. An optical transmitter, according to claim 1, wherein:

said small quantity of intensity modulation employs an amplitude smaller than an amplitude in said intensity modulation for said data signals.

4. An optical transmitter for optical time-division multiplexing transmission, comprising:

data signal sources corresponding to a plurality of channels;

a plurality of means for outputting an optical signal corresponding to said data signal sources;

means for outputting a channel identification signal with a channel frequency proper to each of said plurality of channels to said optical signal corresponding to said plurality of optical signal outputting means;

a plurality of means for superposing said channel identification signal on said optical signal by using intensity modulation to output a channel-frequency-multiplexed optical signal; and means for optically-time-division-multiplexing said channel-frequency-multiplexed optical signal to output an optically-time-division-multiplexed signal.

5. An optical transmitter, according to claim 4, wherein:

said optical signal outputting means is composed of a pulse light source to output pulse light with a constant repetition period corresponding to each of said plurality of data signal sources, and an optical modulator to intensity-modulate said pulse light by a data signal output from a corresponding one of said data signal sources.

6. An optical transmitter, according to claim 5, wherein:

said optically-time-division-multiplexing means conducts time-division multiplexing by giving an optical path difference to said channel-frequency-superposed optical signal corresponding to each of said plurality of channels.

7. An optical transmitter, according to claim 4, wherein:

said optical signal outputting means is composed of a pulse light source to output pulse light with a constant repetition period, an optical divider to divide said pulse light to output a divided pulse light, and an optical modulator to intensity-modulate said divided pulse light by a data signal output from a corresponding one of said data signal sources.

8. An optical transmitter, according to claim 7, wherein:

said optically-time-division-multiplexing means conducts time-division multiplexing by giving an optical path difference to said channel-frequency-superposed optical signal corresponding to each of said plurality of channels.

9. An optical transmitter, according to claim 4, wherein:

said optically-time-division-multiplexing means conducts time-division multiplexing by giving an optical path difference to said channel-frequency-superposed optical signal corresponding to each of said plurality of channels.

10. An optical transmitter for optical time-division multiplexing transmission, comprising:

data signal sources corresponding to a plurality of channels;

means for outputting a channel identification signal with a channel frequency proper to each of said plurality of channels;

means for adding a data signal output from a corresponding one of said data signal sources and said channel identification signal to output a channel-identification-signal-superposed signal;

a pulse light source to output pulse light with a constant repetition period;

plural optical modulators for intensity-modulating said pulse light by said channel-identification-signal-superposed signal to output a channel-frequency-multiplexed optical signal; and means for optically-time-division-multiplexing said channel-frequency-superposed optical signal to output an optically-time-division-multiplexed signal.

11. An optical receiver for optical time-division multiplexing transmission, said optical receiver for receiving an optical time-division-multiplexed signal from an optical transmitter for optical time-division multiplexing transmission, said optical transmitter comprising data signal sources corresponding to a plurality of channels, a plurality of means for outputting an optical signal corresponding to said data signal sources, means for outputting a channel identification signal with a channel frequency proper to each of said plurality of channels to said optical signal corresponding to said plurality of optical signal outputting means, a plurality of means for superposing said channel identification signal on said optical signal by using intensity modulation to output a channel-frequency-multiplexed optical signal, and means for optically-time-division-multiplexing said channel-frequency-multiplexed optical signal to output an optically-time-division-multiplexed signal, comprising:

means for identifying each of said channels by detecting a corresponding one of said low-frequency signals when said optical time-division-multiplexed signal received is demultiplexed to each of said channels.

12. An optical receiver, according to claim 11, wherein:
said optical signal outputting means is composed of a pulse light source to output pulse light with a constant repetition period corresponding to each of said plurality of data signal sources, and an optical modulator to intensity-modulate said pulse light by a data signal output from a corresponding one of said data signal sources.

13. An optical receiver, according to claim 11, wherein:
said optical signal outputting means is composed of a pulse light source to output pulse light with a constant repetition period, an optical divider to divide said pulse light to output a divided pulse light, and an optical modulator to intensity-modulate said divided pulse light by a data signal output from a corresponding one of said data signal sources.

14. An optical receiver, according to claim 11, wherein:
said optically-time-division-multiplexing means conducts time-division multiplexing by giving an optical path difference to said channel-frequency-superposed optical signal corresponding to each of said plurality of channels.

15. An optical receiver for optical time-division multiplexing transmission, said optical receiver for receiving an optical time-division-multiplexed signal from an optical transmitter for optical time-division multiplexing transmission, said optical transmitter comprising data signal sources corresponding to a plurality of channels, a plurality of means for outputting an optical signal corresponding to said data signal sources, means for outputting a channel identification signal with a channel frequency proper to each of said plurality of channels to said optical signal corresponding to said plurality of optical signal outputting means, a plurality of means for superposing said channel identification signal on said optical signal by using intensity modulation to output a channel-frequency-multiplexed optical signal, and means for optically-time-division-multiplexing said channel-frequency-multiplexed optical signal to output an optically-time-division-multiplexed signal, comprising:

means for dividing said optically-time-division-multiplexed signal into signals corresponding to the number of said plurality of channels to output a divided optically-time-division-multiplexed signal;

a frequency-divided clock extracting circuit for generating a frequency-divided clock signal with a repetition frequency of said pulse light before said time-division multiplexing from said optically-time-division-multiplexed signal;

a phase shifting circuit for shifting a phase of said frequency-divided clock signal; and an optical time-division demultiplexing means for taking out said divided optically-time-division-multiplexed signal for each of said plurality of channels while synchronizing with a timing of said frequency-divided clock signal to output an demultiplexed optically-time-division-multiplexed signal.

16. An optical receiver, according to claim 15, wherein:
said optical signal outputting means is composed of a pulse light source to output pulse light with a constant repetition period corresponding to each of said plurality of data signal sources, and an optical modulator to intensity-modulate said pulse light by a data signal output from a corresponding one of said data signal sources.

17. An optical receiver, according to claim 15, wherein:
said optical signal outputting means is composed of a pulse light source to output pulse light with a constant repetition period, an optical divider to divide said pulse light to output a divided pulse light, and an optical modulator to intensity-modulate said divided pulse light by a data signal output from a corresponding one of said data signal sources.

18. An optical receiver, according to claim 15, wherein:
said optically-time-division-multiplexing means conducts time-division multiplexing by giving an optical path difference to said channel-frequency-superposed optical signal corresponding to each of said plurality of channels.

19. An optical receiver, according to claim 15, further comprising:
an optical pulse receiving circuit for receiving said demultiplexed optically-time-division-multiplexed signal and converting it an electrical signal;

an opto-electric converter circuit for receiving a divided part of said demultiplexed optically-time-division-multiplexed signal and converting it into an electrical signal;

a band pass filter for extracting only a frequency component corresponding to said channel frequency from said electrical signal; and a timing control circuit for detecting a signal output from said band pass filter and controlling said phase so as to detect said signal by shifting said phase of said frequency-divided clock signal when said signal is not detected.

20. An optical receiver, according to claim 15, further comprising:
an optical pulse receiving circuit for receiving said demultiplexed optically-time-division-multiplexed signal and converting it an electrical signal;

a band pass filter for receiving a divided part of said demultiplexed optically-time-division-multiplexed signal and extracting only a frequency component corresponding to said channel frequency from said electrical signal;

An opto-electric converter circuit for converting a low-frequency optical signal with said frequency component into an electrical signal; and a timing control circuit for detecting a signal output from said band pass filter and controlling said phase so as to detect said signal by shifting said phase of said frequency-divided clock signal when said signal is not detected.

* * * * *